(12) United States Patent
Mantver

(10) Patent No.: US 7,512,817 B2
(45) Date of Patent: Mar. 31, 2009

(54) MANAGEMENT OF A NETWORK SUPPLYING POWER OVER DATA LINES

(75) Inventor: Uriya Mantver, Tel-Aviv (IL)

(73) Assignee: RIT Technologies Ltd., Tel-Aviv (IL)

( * ) Notice: Subject to any disclaimer, the term of this patent is extended or adjusted under 35 U.S.C. 154(b) by 0 days.

(21) Appl. No.: 11/655,910

(22) Filed: Jan. 22, 2007

(65) Prior Publication Data

US 2007/0174528 A1  Jul. 26, 2007

Related U.S. Application Data

(60) Provisional application No. 60/760,408, filed on Jan. 20, 2006.

(51) Int. Cl.
*G06F 1/28* (2006.01)
(52) U.S. Cl. .................. 713/300; 713/310
(58) Field of Classification Search .......... 713/300, 713/310
See application file for complete search history.

(56) References Cited

U.S. PATENT DOCUMENTS

| 5,483,467 | A | 1/1996 | Krupka et al. |
| 6,574,586 | B1 | 6/2003 | David et al. |
| 2005/0245127 | A1* | 11/2005 | Nordin et al. ............ 439/540.1 |
| 2005/0246562 | A1* | 11/2005 | Rimboim et al. ............ 713/300 |

* cited by examiner

*Primary Examiner*—Tse Chen
(74) *Attorney, Agent, or Firm*—Pearl Cohen Zedek Latzer, LLP

(57) ABSTRACT

According to some embodiments of the invention, a patch panel having power and connectivity management capabilities is provided. The patch panel may include on a single printed circuit board a power distribution module to control and manage distribution of power over data communication cables and a scanning module to enable management of end-to-end physical connectivity of communication ports of a telecommunication network.

15 Claims, 2 Drawing Sheets

MANAGEMENT OF A NETWORK SUPPLYING POWER OVER DATA LINES

CROSS REFERENCE TO RELATED APPLICATIONS

The present invention claims benefit of U.S. provisional application No. 60/760,408, filed Jan. 20, 2006, entitled "Managed Power Over Ethernet Patch Panel", the subject matter of which is incorporated herein by reference.

BACKGROUND OF THE INVENTION

The need for connectivity monitoring capability of all the different components of a telecommunication network is well known. In these networks, the dynamic interconnections between communication ports located within patch panels or active devices are provided by multiconductor cables, also known as patch cords. Accordingly, monitoring and mapping the physical connectivity of the network require real-time identification of changes in the interconnections between the ports. Some existing solutions include patch panels with special circuitry to enable transmission and receipt of control signals over patch cords connecting different patch panels. These patch panels are called 'managed' patch panels. Each connection or disconnection of patch cords is being monitored by the system and different visual presentations of information can be provided such as LED's, computer graphics etc. Such an exemplary system is described in U.S. Pat. No. 5,483,467, assigned to the assignee of this patent application, the subject matter of which is incorporated herein by reference.

During the last years there is an increasing need for applications which enable feed of power over data communication lines. For example, applications using the technology of Power over Ethernet (PoE) which allows the use of applications such as Voice over Internet Protocol (VoIP). The power may be injected by a power source equipment (PSE) at the switch or by a midspan PSE, where a mediation device feeds the power to the data lines. The switch and the midspan have no capability to monitor the physical port connections, and accordingly even when a midspan is interconnected to a 'managed' patch panel, the system will not enable the management of the physical layer connectivity. A solution which combines management and monitoring of both power and physical port connections is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
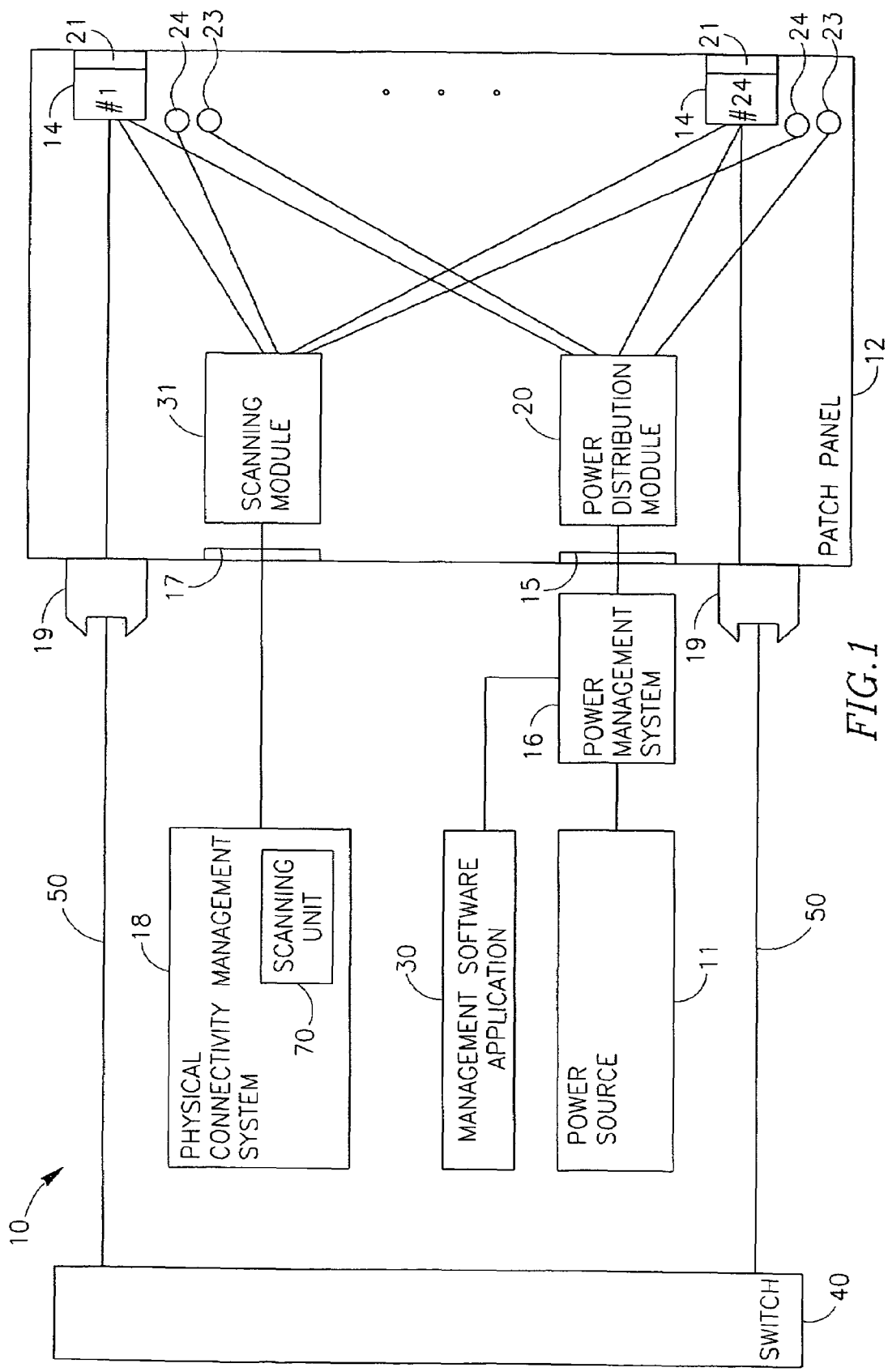
FIG. 1 is a high level diagram of a portion of a communication system having a physical connectivity and power management capabilities according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present invention are directed to an integrated solution for management of physical connectivity and power of telecommunication systems that uses power inline technologies. A connectivity and power management patch panel, according to embodiments of the invention, may provide a cabling system with the capability to integrate monitoring of both power feed from an external power source to the lines and end-to-end physical layer connectivity in real-time. Although the scope of the present invention is not limited in this respect, the power inline technologies may include Power over Ethernet (PoE) according to the IEEE Standard Std 802.3af-2003 published 18 Jun. 2003.

Reference is now made to FIG. 1, which is a block diagram of an exemplary illustration of a portion of a communication cabling system having physical connectivity and power management capabilities according to embodiments of the present invention. A communication cabling system 10 may include a patch panel 12 having powered communication ports 14 through which data signals and power, if needed, may be transmitted to end devices (not shown) via communication cables (not shown). In the exemplary illustration of FIG. 1, for simplicity, only 2 ports are illustrated, however, it should be understood to a person skilled in the art that the number of communication port may be any suitable number of ports, for example, 24 or 48 ports. Although embodiments of the present invention are not limited in this respect, patch panel 12 may provide the basic characteristics of a structured cabling system according to international standards for structured cabling systems such as ANSI/TIA/EIA-568-B and ISO/IEC 11801, and performance levels category 5, 5e, 6 and higher, defined in these standards.

System 10 may further include a switch 40 coupled to patch panel via communication cables 50 for transmiwng data signals, a physical connectivity management system 18 coupled to patch panel 12 to provide end-to-end physical layer connectivity control and real time monitoring and a power management system 16 coupled to a power source 11 and to patch panel 12 to enable the transmission of power over the communication lines to the end devices.

Power management system 16 connected to a power source 11 may enable feed of power over the data communication lines, for example, according to Power over Ethernet (PoE) technology as is described in IEEE802.3af standard. The IEEE802.3af standard defines a PoE system that involves delivering power over unshielded twisted-pair wiring from a Power Sourcing Equipment (PSE) to a Powered Device (PD) located at opposite sides of a link, such as IP phones, wireless LAN access points, personal computers and Web cameras. The PoE system eliminates the need for additional outlets and wiring to supply power to network devices. Instead, power is supplied over Ethernet cabling used for data transmission and through patch panel 12.

Patch panel 12 may be connected to one or more communication switches, such as for example switch 40 via connectors 19 and to a plurality of end devices or ports of other patch panels via ports connectors 21. Although embodiments of the invention are not limited in this respect, connectors 19 may be insulated displacement connectors (IDC) and port connectors may be, for example, RJ45 connectors. In the exemplary illustration of FIG. 1, for simplicity, only 2 ports are illustrated, however, it should be understood to a person skilled in the art that the number of communication port may be any suitable number of ports, for example, 24 or 48 ports. Data traffic may flow from switch 40 through patch panel 12 to the end equipment and back.

According to embodiments of the present invention, patch panel 12 may include a printed circuit board having a power distribution module 20 coupled to power management system 16 through one or more power connector(s) 15 via a special cable, as known in the art and to ports 14. The printed circuit board may further include a scanning circuitry module 31 coupled to physical connectivity management system 18 via connector 17 and to ports 14.

Patch panel 12 may further include a plurality of connectivity status indicators 24, each associated with a respective port 14 and coupled to scanning circuitry module 31 for indicating changes associated with the physical connectivity of the respective port 14. Patch panel 12 may further include a plurality of power status indicators 23, each associated with a respective port 14 and coupled to the physical power distribution module 20 for indicating the status of the power delivery over the respective port 14.

Power management system 16 may enable management and control of the power supply to each of communication ports 14, for example, by activating power distribution module 20. Power distribution module 20 may include electrical circuitry which may provide patch panel 12 with the capability of distributing power to each one of communication ports 14 and may control power status indicators 23 as described in detail below.

According to some embodiments of the present invention power management system 16 via power distribution module 20 may search the link for an end device requesting power (PD), may classify the PD, and may supply power to the link if a PD is detected. In addition power management system 16 via power distribution module 20 may monitor the power on the link, and may disconnect power source 11 when it is no longer requested or required.

According to some embodiments of the present invention, communication cabling system 10 may include physical connectivity management system 18. Physical connectivity management system 18 may include a scanning unit 70 coupled to scanning module 31 through connector 17 and may enable transmission and receipt of control signals over patch cords or other multiconductor cables connecting for example two patch panels 12.

As described in U.S. Pat. No. 5,483,487, assigned to the assignee of this patent application, the subject matter of which is incorporated by herein by reference, scanning unit 70 may automatically and optionally continuously sense the interconnection arrangement of the patching cables and thus the interconnection status of ports 14. Scanning unit 70 may provide an interconnection status output to a display unit (not shown). An exemplary management system is sold under the trade name of PatchView™ by Rit Technologies Ltd., Tel Aviv, Israel, the assignee of this patent application.

According to some embodiments of the present invention, scanning module 31 may include special circuitry as described in U.S. Pat. No. 5,483,487, which may allow real-time identification of changes in the interconnections between the ports by transmitting and receiving of control signals over, for example, patch cords connecting different patch panels 12.

Scanning module 31 may include scanning capabilities in order to electrically determine the connectivity status between pairs of ports. For example, physical connectivity management system 18 may transmit and receive scanning signals through scanning module 31 to ports 14 in order to obtain a connectivity map of the communication cabling system 10. In addition, each connection or disconnection of a patch cord may be monitored by scanning module 31 and physical connectivity management system 18 and different visual presentations of information may be provided in real time to connectivity status indicators 24, while continuously scanning and monitoring without interfering in data traffic.

Communication ports 14 may provide data and power to remote devices or other patch panels. In addition, patch panel 12 may include visual presentations of power and connectivity information.

According to some embodiments of the present invention, patch panel 12 may allow management and real time monitoring of power and physical connectivity and may include power and physical connectivity management and monitoring circuitry. The combination and integration of power and physical connectivity management circuitry may reduce the physical size of patch panel 12, for example, by implementing management of power and physical connectivity on a single printed circuit board. Although a single printed board is described, it should be understood that the invention is not limited in this respect, and embodiments of the invention may be implemented with more than one printed circuit board with a single patch panel. Patch panel 12 may be a standard patch panel having standard dimensions according to the EIA RS 310-C standard published on November 1977. For example, patch panel 12 may be a 1U panel having height of one standard unit 1U. The EIA standard denotes 1U as a panel height of 44.45 mm (1.75").

According to some embodiments of the present invention, when the power is turned off or power management system 16 is disconnected, patch panel 12 may serve as a regular telecommunication patch panel providing data to a network device according to the required performance level with or without physical connectivity management capabilities.

According to some embodiments of the present invention, patch panel 12 may include or may be coupled to a management software application 30. Management software application may collect data from both physical connectivity management system 18 and power management system 16. In one embodiment of the invention, the physical connectivity management system 18 may send monitoring signals to plurality of ports 14 of device 12, and may obtain a connectivity map by identifying the signal received from the corresponding port. This information may be sent to the management software application 30, which may aggregate it with additional data and may present connectivity changes and alerts on plurality of indicators or a graphical user interface which are described in details below.

According to some embodiments of the present invention, patch panel 12 may include visual indications of power and connectivity monitoring. Each of port 14 may include or may be coupled to one or more connectivity status indicator 24 and one or more power status indicator 23. Status indicators 23 and 24 may be light emitting diodes, (LED's), liquid crystal displays (LCD'S) or any other suitable status indicator known in the art.

Power status indicator 23 may be controlled by power distribution module 20 and may provide real-time, per port indication of normal conditions, short circuit, overload or any other indication. Power status indicators 23 may provide visual indications of power feed over ports 14 and may allow visual monitor and control of the power status of ports 14. Power status indicators 23 may indicate various power statuses, for example, power presence or alert of technical problem in power supply of ports 14, normal conditions, short circuit, overload or any other indication. Power status indicators 24 may include LEDs, computer graphics interface or other graphic user interface.

Connectivity status indicator 24 may be controlled by scanning module 31 and may provide real-time information on the status of end-to-end connectivity between, for example, users and the respective equipment, and may report all connectivity changes. Connectivity status indicator 24 may guide a system administrator in planning and implementing provisioning activities and checking their integrity in real time.

Connectivity status indicators 24 may provide visual indications of connection or disconnection of ports 14 and may allow visual monitoring and control of the connectivity status of ports 14. Connectivity status indicators 24 may indicate various statuses, for example, alert of technical problem of a port, a port's performance or any other status related to end-to-end status information of ports 14. Connectivity status indicators 24 may include LED's, computer graphics interface or other graphic user interface.

According to some embodiments of the present invention, a management software application, such as management software application 30, may present connectivity changes and alerts on connectivity status indicators 24, and may initiate technician guidance by turning on and off status indicators of each of the relevant ports 14. Management software application may present power information for each of ports 14 on power status indicators 23, which may include on/off information and power level. The integration of the connectivity and power information may enable presentation of full real time system information over one graphical user interface.

Figure 2:
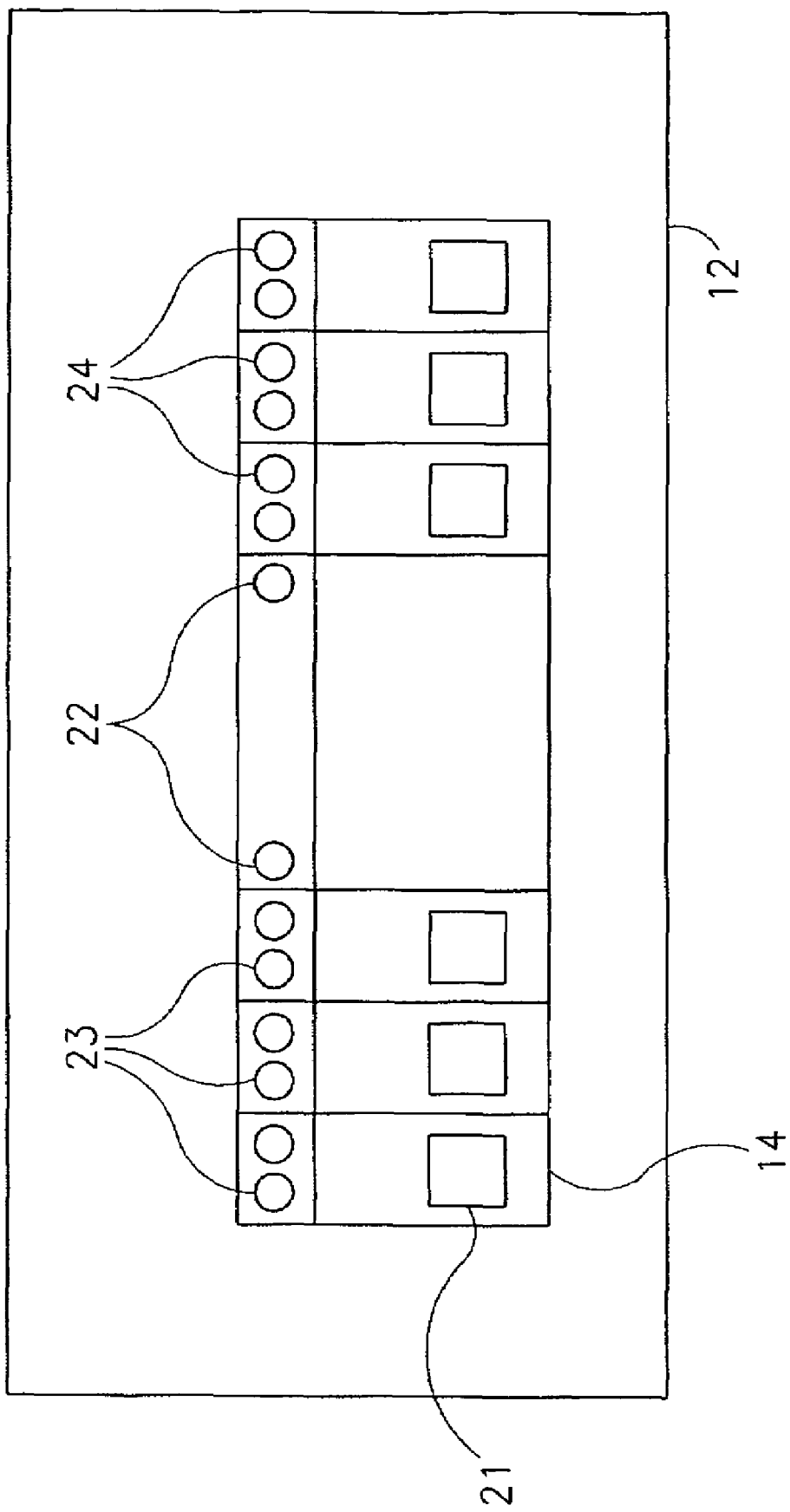
FIG. 2 is a front view of a patch panel of a communication system having connectivity and power management capabilities according to embodiments of the present invention.

Reference is now made to FIG. 2, which is a front view of a patch panel of a communication system having connectivity and power management capabilities according to embodiments of the present invention. Each port 14 may transmit and/or receive data and power to/from remote devices or other patch panels through connectors 21 and may use patch cords for ports interconnections. In one embodiment of the invention, connectors 21 may include additional pin used for transmission and receipt of monitoring or scanning signals, for example, RJ45 connector may include additional $9^{th}$ pin, while in another embodiment connector 21 may include an adjacent contact for the purpose of providing the connectivity information to, for example, physical connectivity management system 18 (of FIG. 1).

According to some embodiments of the present invention, patch panel 12 may include additional visual indications of power monitoring. One or more group power indicator(s) 22 may provide information about external power management system, e.g., system 16 of FIG. 1, presence and activity. In some embodiments of the invention, group power indicator(s) 22 may include LED's, computer graphics or any other form of visual indicator or visual presentation and may provide a real-time network monitoring through the front panel of patch panel 12. Any number of global power indicators 22 may be used, for example, each indicator may be coupled to one of power connectors 15 or each indicator may provide different status indication such as level, presence or activity of the power.

What is claimed is:

1. A patch panel comprising:
a plurality of communication ports to transmit and receive data and power over communication lines;
a scanning circuitry that enables reception and transmission of control signals to automatically identify physical connections between said ports and other ports external to the patch panel, wherein the control signals are external and independent from the data received by the communication ports over the communication lines; and
a power distribution circuitry coupled to said ports to enable control of power supply to said ports.

2. The patch panel of claim 1 further comprising:
a plurality of connectivity status indicators, each of which associated with one of said ports to indicate physical connectivity status of said port; and
a plurality of power status indicators, each of which associated with one of said ports to indicate power status of said port,
wherein said connectivity status indicators are controlled by said scanning circuitry and said power status indicators are controlled by said power distribution circuitry.

3. The patch panel of claim 1, wherein said power distribution circuitry is coupled to a power management system, and said scanning circuitry is coupled to a physical connectivity management system.

4. The patch panel of claim 3, wherein status of said physical connectivity comprises representation of real time monitoring signals received from said physical connectivity management system.

5. The patch panel of claim 3, wherein said power management system is to manage feed of power to said data communication lines.

6. The patch panel of claim 2, wherein said connectivity status indicators and said power status indicators comprise light emitting diodes.

7. The patch panel of claim 1, wherein said scanning circuitry and power distribution circuitry are placed on a single printed circuit board.

8. The patch panel of claim 1, wherein said patch panel has a height of one standard unit (1U).

9. A communication system comprising:
a patch panel having a plurality of communication ports to transmit and receive data and power over communication lines, a scanning circuitry that enables reception and transmission of control signals that are external and independent from the data received by the communication ports over the communication lines and a power distribution circuitry;
a physical connectivity management system coupled to said scanning circuitry to enable physical connectivity management of said ports and automatic identification of physical connections between said ports and other ports external to the patch panel by transmission and reception of the control signals; and
a power management system coupled to said power distribution circuitry to enable power management of said ports.

10. The communication system of claim 9 further comprising:
a plurality of connectivity status indicators, each of which associated with one of said ports to indicate physical connectivity status of said port; and
a plurality of power status indicators, each of which associated with one of said ports to indicate power status of said port,
wherein said connectivity status indicators are controlled by said scanning circuitry and said power status indicators are controlled by said power distribution circuitry.

11. The communication system of claim 10, wherein said physical connectivity status comprises representation of real time monitoring signals received from said physical connectivity management system.

12. The communication system of claim 9, wherein said power management system is to manage feed of power to said data communication lines.

13. The communication system of claim 10, wherein said connectivity status indicators and said power status indicators comprise light emitting diodes.

14. The communication system of claim 9, wherein said scanning circuitry and power distribution circuitry are placed on a single printed circuit board.

15. The communication system of claim 9, wherein said patch panel has a height of one standard unit (1U).

* * * * *